United States Patent [19]

Goodley

[11] Patent Number: 5,512,340
[45] Date of Patent: Apr. 30, 1996

[54] CATALYST AND PROCESS FOR PRODUCING POLYESTER

[75] Inventor: George R. Goodley, Kinston, N.C.

[73] Assignee: E. I. du Pont de Nemours and Company, Wilmington, Del.

[21] Appl. No.: 487,767

[22] Filed: Jun. 8, 1995

[51] Int. Cl.$^6$ .................................................. B32B 1/08
[52] U.S. Cl. ........................ 428/35.7; 528/275; 528/280; 528/285; 528/295; 528/302; 528/308; 528/308.1; 528/308.6; 528/308.8; 528/296; 428/35.7; 428/364; 524/777; 524/785; 524/786
[58] Field of Search ............................ 528/280, 275, 528/282, 285, 295, 296, 302, 308, 308.1, 308.6, 308.8; 428/35.7, 364; 524/777, 785, 786

[56] References Cited

U.S. PATENT DOCUMENTS

| 4,590,259 | 5/1986 | Kosky et al. | 528/272 |
| 5,116,938 | 5/1992 | Engel-Bader et al. | 528/272 |
| 5,166,311 | 11/1992 | Nichols | 528/285 |

*Primary Examiner*—Samuel A. Acquah

[57] ABSTRACT

A cobalt/aluminum/chlorine catalyst for the polymerization of polyesters of terephthalic acid and an ethylene glycol, a process for the preparation of such catalysts, a process for the polymerization of terephthalic acid and an ethylene glycol, a process of spinning fibers of such polymers where reduced spinneret wiping is achieved, and fibers of such polyesters containing catalyst residues of cobalt/ aluminum/ chlorine, and films or bottles of said polymer.

11 Claims, No Drawings

CATALYST AND PROCESS FOR PRODUCING POLYESTER

FIELD OF THE INVENTION

This invention relates to a catalyst useful for the preparation of high molecular weight polyester polymers of terephthalic acid and an ethylene glycol, to the process for the production of such high molecular weight polyester polymers, to such high molecular weight polyester polymers made by the process using the catalyst, and to products made from such polyester high molecular weight polymers such as fibers, films, and bottles.

BACKGROUND OF THE INVENTION

Many commercial processes for the production of high molecular weight polyester polymers of terephthalic acid and an ethylene glycol employ an antimony catalyst. The use of an antimony catalyst presents some problems when the polymer is melt spun into fibers, i.e., the antimony catalyst residues form deposits around spinneret holes. These deposits must be wiped off from time to time or the filaments will be defective. It is believed that the antimony deposits form because antimony is present in the polymer as antimony glycollate, which boils at about the temperature of the spinneret. The antimony glycollate vaporizes, and then hydrolyzes, leaving a non-volatile antimony containing deposit at the spinneret. A non-antimony containing catalyst is, therefore, a desirable goal.

High molecular weight polyester polymers of terephthalic acid and ethylene glycol are usually produced by one of three different processes, namely, (1) the direct esterification and then polymerization of pure terephthalic acid and ethylene glycol. (This direct polymerization process is satisfactory only if the ingredients are of high purity.) (2) Transesterification of dimethylterephthalate (DMT) and ethylene glycol to form, what is called in the art, "DMT monomer." The transesterification usually takes place in the presence of a manganese, zinc, or lithium catalyst. The DMT monomer is a mixture of ester products (low molecular weight polymer) in which most of the end groups are glycoxyl, and the mixture contains molecules with a degree of polymerization that is 1, 2, or 3. The DMT monomer is then further polymerized to high molecular weight polymer often with an antimony catalyst. The manganese catalyst used in the transesterification reaction tends to cause undesirable color in the final product unless it is sequestered; so phosphorus compounds, for example, $H_3PO_4$, are often added before the DMT monomer is polymerized to sequester the manganese catalyst residue. (3) Reaction of medium purity (polymer grade) terephthalic acid and ethylene glycol to form, what is called in the art, "oligomer." The oligomer mixture contains color forming catalyst residues from the manufacture of terephthalic acid. These catalyst residues include manganese, iron, and molybdenum. These catalyst residues are then sequestered by the addition of a phosphoric compound, for example, $H_3PO_4$, and then polymerized (polycondensed) to form high molecular weight polymer. The oligomer has a degree of polymerization of about 7, has 500 to 1000 carboxyl end groups per 10 to the 6 grams of oligomer. Some cyclic materials are present in the oligomer. (This third process does not require the highly purified starting materials necessary for the first process described above.) The catalyst of the invention is useful in all three of these processes. In the first process described, the catalyst of the invention may be added at the direct esterification step or at the beginning of the polymerization; in the second process described, the catalyst will be added after the DMT monomer is formed and after the manganese catalyst is sequestered (deactivated); and in the third process the catalyst will be added after the color-forming metal impurities in the oligomer are deactivated.

Combinations of metals compounds have been employed in the prior art as catalyst for the preparation of high molecular weight polymers of terephthalic acid and ethylene glycols: see, for example, Nichols U.S. Pat. No. 5,166,311; Engle-Bader et al. U.S. Pat. No. 5,116,938; and Kosky et al. U.S. Pat. No. 4,590,259.

SUMMARY OF THE INVENTION

The present invention is a polymerization catalyst useful for the preparation of high molecular weight polymers of terephthalic acid and ethylene glycol comprising a cobalt salt and an aluminum compound selected from the group consisting of aluminum chloride and aluminum hydroxychloride dissolved in ethylene glycol, where the mole ratio of aluminum to cobalt is 1 to 1 to 16 to 1, and where the mole ratio of chlorine to aluminum is in the range of 0.25 to 3.

The present invention is also a process for the production of poly(ethylene terephthalate) polymer, which comprises combining a polymerization catalyst formed by combining a cobalt salt that is soluble in ethylene glycol and aluminum compound selected from aluminum chloride and aluminum hydroxychloride in ethylene glycol, where the mole ratio of aluminum to cobalt is 1 to 1 to 16 to 1 and a chlorine to aluminum ratio in the range of 0.25 to 3 with (a) terephthalic acid and ethylene glycol, or (b) low molecular weight poly(ethylene terephthalate) polymer (also called DMT monomer), or (c) oligomer, where the concentration of cobalt in the thus formed mixture is in the range of about 10 to 100 parts per million parts of the mixture, and polymerizing the mixture.

Useful cobalt salts include cobaltous acetate tetrahydrate, cobaltous nitrate, cobaltous chloride, cobalt acetylacetonate, cobalt napthenate, and cobalt salicyl salicylate. The preferred cobalt salts are soluble in ethylene glycol in the 100–10,000 parts per million cobalt range.

This invention is also a process for the preparation of a catalyst for the preparation of poly(ethylene terephthalate) polymer, which comprises heating a cobalt salt and aluminum compound selected from the group consisting of aluminum chloride and aluminum hydroxychloride in ethylene glycol to a temperature in the range of about 110 to 180 degrees C. where the aluminum to cobalt mole ratio is in the range of 1 to 1 to 16 to 1.

This invention is also a poly(ethylene terephthalate) polymer having a NLRV of greater than about 12 containing catalyst residues of cobalt salt and aluminum compound selected from the group consisting of aluminum chloride and aluminum hydroxychloride. The polymer can be in the form of a fiber or film or bottle.

This invention is also a process for the production of poly(ethylene terephthalate) fiber in which there is a reduced need to wipe antimony deposits from the spinneret face which comprises melt spinning a molten mixture of poly(ethylene terephthalate) polymer containing catalyst residue of cobalt salt and an aluminum compound selected from the group consisting of aluminum chloride and aluminum hydroxychloride.

DETAILED DESCRIPTION

When the catalyst of the present invention is used to prepare polyester polymer from polymer grade terephthalic acid or high purity terephthalic acid, the terephthalic acid (TPA) and ethylene glycol will be fed into a reactor. The reaction to form oligomer will proceed without catalyst and is usually conducted at a temperature of about 240 to about 300 degrees C. and at a pressure of about 0 to 50 pounds per square inch. Usually, the reactor will be fed more than an stoichiometric amount of the ethylene glycol, and the excess glycol separated by distillation. To the oligomer stream may then be added coloring agents such as carbon black, delustrants, opaquing agents, color, and thermal stabilizers, copolymerization additives such glycol esters of sodium dimethyl isophthalate-5-sulfonate, isophthalic acid, trimellitic acid and the like. Titanium dioxide is a conventional additive; it serves as a whitening agent and a delustrant. Most commercial grades of titanium dioxide that are used in polyester fiber contain antimony compounds which serve as thermal and ultraviolet light stabilizers; so if titanium dioxide is added to the oligomer, the final product will still contain some antimony, and antimony will show up in the analysis of the polymer. The antimony in the $TiO_2$ is chemically bound in the $TiO_2$ crystal. Since polymer grade TPA and plant grade ethylene glycol contain various amount of metals, for example, iron, titanium, molybdenum, cobalt, and manganese, that tend to give color to the final product, a phosphorus compound, such as orthophosphoric acid, is often added to TPA/glycol slurry that feeds the direct esterfier or to the oligomer line and mixed to sequester these color forming metal impurities. Then the catalyst of the present invention is added to the oligomer stream, and the oligomer is then subjected to polycondensation in the usual manner.

When the catalyst of the present invention is used to prepare polyester polymer from dimethylterephthalate (DMT), the DMT and ethylene glycol will be fed into a reactor along with a transesterification catalyst, for example, manganese, zinc, or lithium acetates, or glycollares. The reaction that forms DMT monomer is usually conducted at a temperature of about 190 to about 260 degrees C. and at a pressure of about 0 to 10 pounds per square inch. Sodium dimethyl isophthalate-5-sulfonate may be added with the catalyzed glycol to make a copolymer. Methanol will be separated by distillation. To the DMT monomer stream may then be added fillers, coloring agents, such as carbon black, delustrants, opaquing agents, color, and thermal stabilizers, copolymerization additives such as glycol esters of sodium dimethyl isophthalate-5-sulfonate, isophthalic acid, trimellitic acid and the like. Titanium dioxide is a conventional additive; it serves as a whitening agent and a delustrant. Most commercial grades of titanium dioxide used in polyester fiber contain antimony compounds which serve as thermal and ultraviolet light stabilizers; so if titanium dioxide ($TiO_2$) is added to the DMT monomer, the final product will still contain some antimony, and antimony will show up in the analysis of the polymer. The antimony in the $TiO_2$ is chemically bound in the $TiO_2$ crystal. A phosphorus compound such as orthophosphoric acid is then added at this point to (deactivate) sequester the ester exchange catalyst, for example, manganese compound. Then the catalyst of the present invention is added to the stream, and the DMT monomer subjected to polycondensation in the usual manner.

When the catalyst of the present invention is used to prepare polyester polymer from pure terephthalic acid, the terephthalic acid (TPA) and ethylene glycol will be fed into a reactor. The reaction to form oligomer will proceed without catalyst and is usually conducted at a temperature of about 240 to about 300 degrees C. and at a pressure of about 0 to 50 pounds per square inch gauge. Usually, the reactor will be fed more than a stoichiometric amount of the ethylene glycol, and the excess glycol separated by distillation. To the oligomer stream may then be added coloring agents, such as carbon black, delustrants, opaquing agents, color, and thermal stabilizers, copolymerization additives such as glycol esters of sodium dimethyl isophthalate-5-sulfonate, isophthalic acid, trimellitic acid, and the like. Titanium dioxide is a conventional additive; it serves as a whitening agent and a delustrant. Most commercial grades of titanium dioxide used in polyester fiber contain antimony compounds which serve as thermal and ultraviolet light stabilizers; so if titanium dioxide is added to the oligomer, the final product will still contain some antimony, and antimony will show up in the analysis of the polymer. The antimony in the $TiO_2$ is chemically bound in the $TiO_2$ crystal. Then the catalyst of the present invention is added to the oligomer stream, and the oligomer subjected to polycondensation in the usual manner.

In order to be a viable replacement for the traditional antimony catalyst used to polymerize terephthalic acid/ethylene glycol polymers, the desired catalyst should meet the following criteria: 1. It is preferably soluble in ethylene glycol. 2. It should produce a polymer which, when formed into a yarn, has a color, dyeability, and durability about as good as the yarn made with antimony catalyst. 3. It should be capable of being used in the same equipment that is presently used for antimony catalyst. 4. It should have a reactivity as good as the antimony catalyst. 5. It should not deposit on the spinnerets. 6. It should cost about the same as an antimony catalyst. 7. The catalyst residues should be not be toxic. The catalyst of the invention meets these criteria.

The catalyst of the invention may be prepared as follows:

1. To a 500 cc agitated flasks with reflux condenser add:
    0.64 grams of Cobalt diacetate $\times 4H_2O$ dissolved in about 209 grams of ethylene glycol at room temperature.

10.39 grams of Nalco 8676 (aluminum hydroxychloride) is then added with mixing. (Nalco 8676 has an aluminum to chlorine mole ratio of about 2. Nalco 8676 is a colloidal suspension in water of aluminum hydroxychloride particles. It is a 10% solution (based on $Al_2O_3$) of 20 nanometer particles.)

2. Heat 110 to 160 degrees C. and hold about 30 minutes. In ethylene glycol the solution turns from a pink to a deep purple. Then cool the catalyst solution. Analyses of the catalyst (Item 3 in the table below) indicated that the chlorine to aluminum mole ratio was about 0.5, and the aluminum to cobalt mole ratio is about 8 to 1.

Other catalysts were prepared by the above procedure and tabulated below.

| TABLE OF POLYMERIZATION CATALYST SOLUTIONS | | | |
|---|---|---|---|
| SAMPLE NO. | MOLS Al MOLS Co | GRAMS $CoAc2 \times 4H_2O$ | GRAMS NALCO 8676 | GRAMS OF ETHYLENE GLYCOL |
| 1 | 2 | .64 | 2.57 | 216.8 |
| 2 | 4 | .64 | 5.14 | 214.2 |
| 3 | 8 | .64 | 10.3 | 209 |
| 4 | 16 | .64 | 20.6 | 198.8 |
| | | | GRAMS OF NALCO 8187* | |
| 5 | 4 | .64 | 2.6 | 216.8 |
| 6 | 8 | .64 | 5.2 | 214 |

-continued

TABLE OF POLYMERIZATION CATALYST SOLUTIONS

| SAMPLE NO. | MOLS Al MOLS Co | GRAMS CoAc2 × 4H$_2$O | GRAMS NALCO 8676 | GRAMS OF ETHYLENE GLYCOL |
|---|---|---|---|---|
|  |  |  | GRAMS OF AlCl$_3$ |  |
| 7 | 2 | .64 | .686 | 218.7 |
| 8 | 4 | .64 | 1.372 | 218 |
| 9 | 8 | .64 | 2.744 | 216.6 |
| 10 | 16 | .64 | 5.489 | 213.9 |

*Nalco 8187 is aluminum hydroxychloride solution in water having an aluminum content measured as Al$_2$O$_3$ of 22% by weight.

(Nalco 8676 and 8187 were analyzed. The percent solids was determined by drying at 110 degrees C. Nalco 8676 was 21.9+/–1.6% solid, and Nalco 8187 was 46.2+/–0.39% solid. When calcined at 900 degrees C., Nalco 8676 was 9.75+/–0.23% solid, and Nalco 8187 was 22.6+/–0.05% solid. The aluminum content of Nalco 8676 was 5.68%, and the chlorine content was 3.77%. The aluminum content of Nalco 8187 was 12.4% and the chlorine content was 9.3.%)

To make polymer in a 1 liter resin kettle, add 400 grams of catalyst-free TPA oligomer. Add 8.6 grams of the catalyst solutions made per above table to the oligomer with ethylene glycol to make a 2/1 mole ratio of ethylene glycol/terephthalate. The total ethylene glycol and catalyst solution is 129 grams.

It is common commercial practice to vary the composition of polyester fibers by including, in the mixture to be, polymerized monomers that improve the dyeability of fibers made from the polymer. Sodium isophthalic acid-5-sulfonate glycol ester or trimellitic acid glycol ester groups are often incorporated in the polyester chains to improve dyeability. The catalyst of the present invention is compatible with making such copolymers.

EXAMPLES

Example 1

Lab Resin Kettle Example

Four hundred grams catalyst-free oligomer that was made from pure terephthalic acid and ethylene glycol was combined with 120.4 grams of ethylene glycol and 8.6 grams of ethylene glycol containing the cobalt/aluminum catalyst (#3 in the above table). The amount of catalyst was such that the final polymer contained 14.8 parts per million cobalt, and 54 parts per million aluminum. The mixture was stirred at 60 revolutions per minute, heated to 265 degrees C. for 30 minutes, to dissolve and remelt the oligomer into the glycol mixture, and then heated to 275 degrees C. at a pressure of 120 millimeters of mercury and held at this condition for 20 minutes. The temperature was then raised to 280 degrees C., and the vacuum adjusted to 30 millimeters of mercury and held at this condition for 20 minutes. Then the temperature was raised to 285 degrees, and the pressure lowered to about one (+/–0.5) millimeters of mercury and held until the agitator torque reached four pounds per inch at 60 revolutions per minute. Then the agitator speed was lowered to 40 revolutions per minute, and the torque allowed to rise to 4 lbs per inch. At this point, the polymer was cast in ½" wide strips in a pan of cold water. The polymer was then dried and crystallized at 90 degrees for one hour in a vacuum oven and then ground to pass through a 4 millimeters screen, and then the properties of the polymer determined. The polymer had an NLRV of 24.19, COOH ends per 10 to the 6 grams of polymer of 26.5, percent of diethylene glycol of 1.208, and a color on the Hunter scale L=74.3, a=–0.5, and b= 6.8. (NLRV, a measure of relative viscosity, is the ratio at 25 degrees C. of the flow times in a capillary viscometer for the a solution and solvent. The solution is 4.75 wt. percent of polymer in solvent. The solvent is hexafluoroisopropanol.) The polymerization rate was about the same as that obtained with 200 part per million antimony; the color was close to that obtained from 200 part per million antimony, and the amount of diethylene glycol was somewhat higher than that obtained using 200 parts per million antimony, but still acceptable.

Similar examples with other catalysts prepared, as shown in the "Table of Polymerization Catalysts Solutions," give similar results to this Example 1.

Example 2 and Control Examples

Semi-Works Example

Control (Antimony Catalyst)

Dimethyl terephthalate (DMT) is fed at 84 pounds per hour to plate 15 of a 20 plate ester exchange distillation column. Catalyzed glycol was made by dissolving 590 grams of manganese acetate with 4 waters of hydration, 115 grams of sodium acetate, and 853 grams of antimony glycollate at about 50 degrees C in 1200 pounds of ethylene glycol. This catalyst solution was fed at 210 milliliters/minute to plate 17 of the ester exchange column. Virgin glycol was fed to the calandria reboiler at about 70 milliliters/minutes to control the calandria temperature at 237+/–2 degrees C. Glycol boil up in the column was provided by Dowtherm® heat to the calandria's heat exchanger. Methanol was removed from the top of the column, and methanol reflux was provided to condense the glycol vapor. The monomer produced in the calandria was then pumped and filtered through a monomer line to the flasher. 13.8 milliliters/minute of 1% H$_3$PO$_4$ in glycol was added to the monomer line and mixed with the monomer to deactivate the ester exchange manganese catalyst. Then 9.5 milliliters/minute of 5% TiO2 in glycol was injected into the monomer line and mixed with the monomer. The monomer was then prepolymerized in a Dowtherm® heated flashing vessel operated at 245 degrees C. and 90 millimeters of mercury pressure. The discharge from the flasher was fed to a Dowtherm® heated, agitated prepolymerization vessel operated at 275 degrees C. and 30 millimeters of mercury pressure. The goods from the prepolymerization vessel were then fed to a horizontal screen/wire filming agitated finishing vessel. This vessel was run at 285 degrees C and a pressure to produce 19.7+/–0.6 LRV. (LRV is a measure of relative viscosity. It is the ratio at 25 degrees C. of the flow times in a capillary viscometer for a solution and a solvent. The solution is 4.75 weight percent of polymer in solvent. The solvent is hexafluoroisopropanol containing 100 parts per million H$_2$SO$_4$.) The polymer produced was pumped to a spinning machine where yarn was spun at 290 degrees C., quenched, and steam drawn to produce a 70 denier 34 filament trilobal cross section yarn. This process and product properties will be compared with product made by use of the catalyst of the invention.

Dowtherm® is a registered trademark of the Dow Chemical Co.

Catalyst of the Invention with No Toner

The same process used to prepare the control yarn was used except instead of dissolving antimony glycollate in the catalyzed glycol fed to the exchanger, the cobalt/aluminum catalyst was prepared separately. 250 grams of cobalt acetate with 4 waters of hydration were dissolved in 180 pounds of ethylene glycol. 4061 grams of Nalco 8676 was added, and the mixture was heated to 160 degrees C. to form a clear purple solution. This catalyst solution was injected into the monomer line at 24 milliliters/minute after the 11.4 milliliters/minute of 1% $H_3PO_4$ solution in glycol was added to deactivate the manganese catalyst.

Catalyst of the Invention with Toner

The catalyst was run the same way as described in the prior paragraph except 2 parts per million on a polymer basis of carbozyl violet was added with the $TiO_2$ to change the hue color of the fiber.

TABLE results of the control and invention catalyst runs.

|  | Control | w/o Toner | With Toner |
|---|---|---|---|
| Finisher pressure, mm Hg | 2.96 | 2.88 | 3.02 |
| DEG, analyzed | .9 | .83 | .87 |
| $TiO_2$, analyzed | .096 | .097 | .093 |
| Sb analyzed, ppm | 240 | <1 | <1 |
| Cobalt added, ppm | 0 | 24 | 24 |
| Mn, added, ppm | 98 | 98 | 98 |
| Toner added, ppm | 0 | 0 | 2 |
| Tenacity, gram/denier | 3.95 | 3.9 | 3.95 |
| Elongation at break, % | 32 | 33.4 | 33.4 |
| Boil off shrinkage, % | 8 | 7.7 | 7.9 |
| Draw tension, grams | 105 | 104 | 103 |
| (1.2 Draw ratio, 185 degrees C., 150 yard/minute) | | | |
| Glf dye | 109 | 108 | 103 |
| Tube color, Hunter lab | | | |
| L | 84.7 | 83.3 | 82.3 |
| b | 1.2 | 2.5 | 1.15 |
| Color cards, Hunter lab | | | |
| L | 89.4 | 87.4 | 87 |
| a | -.62 | -.38 | -.13 |
| b | .74 | 2.10 | .76 |

No visual difference could be seen between control and run with toner.

There was no significant change in spinning filter pack pressure rise rate.

Invention and control yarns were judged equal in physical properties.

Invention yarn without toner was less white.

Example 3

Semi-Works

Draw Textured Feed Yarn Example Made with TPA Process

Control Example

Oligomer, with about 7 average degrees of polymerization, was made in a commercial direct esterfier reactor. A side stream was pumped to the semi-works' flashing vessel, prepolymerizer, and finishing vessels at 110 pounds per hour. One item was made with no $H_3PO_4$, and one item was made with 14 milliliters/minute of 0.1% $H_3PO_4$ that was injected into the oligomer line and mixed with a static mixer to deactivate color forming metal residues. Then 18.8 milliliters/minute of 1% antimony solution in ethylene glycol as the polymerization catalyst and 23 milliliters/minute of 10% $TiO_2$, as the delustrant, was then added to the oligomer line and mixed with a static mixer. The polymer was spun through a filtration pack and spinneret to produce a 265 denier 34 filament draw textured feed yarn, known as partially oriented yarn (POY). This yarn was textured at 700 meters/minute on a Barmag FK-6-900 texturing machine.

Invention Example

The invention yarn was made in the same equipment, except 16 milliliters/minute of a cobalt aluminum catalyst solution was added to the oligomer line after the $H_3PO_4$ was injected. This catalyst was made by dissolving 250 grams of cobalt acetate with 4 waters of hydration in 180 pounds of ethylene glycol. Then 4061 grams of Nalco 8676 was added. The mixture was then heated with agitation to 170 degrees C. to produce a deep blue solution. The solution's theoretical cobalt level is 0.0725% and aluminum level is 0.263%.

Results comparing control and invention product.

|  | Control Without $H_3PO_4$ | With $H_3PO_4$ | Invention With $H_3PO_4$ |
|---|---|---|---|
| Finisher pressure mm Hg | 3.86 | 2.28 | 4.94 |
| Sb ppm | 228 | 217 | 39 (note 1) |
| TiO2 % | .31 | .28 | .30 |
| P ppm | 4 (from $TiO_2$) | 9.5 | 10.1 |
| COOH ends/10^6 grams | 25 | 26 | 34 |
| DEG % | 1.15 | 1.12 | 1.31 |
| Yarn properties | | | |
| Draw tension, grams 185 degrees C. 1.71 draw ratio 185 yards/minute | 109.5 | 109 | 115 |

Note: 1. 9 parts per million antimony comes from the antimony in $TiO_2$. About 30 parts per million antimony is in the supply of oligomer.

|  | Color on tubes | | |
|---|---|---|---|
| Hunterlab | | | |
| L | 84.9 | 85.7 | 83.7 |
| a | -.3 | -.3 | .4 |
| b | 1.9 | 1.14 | .9 |
| W | 62.8 | 67.8 | 65.9 |
| color on cards | | | |
| L | 91.0 | 91.9 | 90.0 |
| a | -1.0 | -.85 | -.2 |
| b | 2.55 | 1.6 | 1.1 |
| W | 69.5 | 76.1 | 75.3 |
| Tenacity, | 2.47 | 2.44 | 2.43 |
| grams/denier | 123.1 | 121.7 | 126.8 |

Colors of Control and Invention with $H_3PO_4$ were judged equivalent by visual examination.

The textured yarn results show:

|                                              | Control Without H$_3$PO$_4$ | With H$_3$PO$_4$ | Invention |
|----------------------------------------------|------------------------------|------------------|-----------|
| Tenacity grams/denier                        | 4.37                         | 4.19             | 4.21      |
| Elongation %                                 | 22.38                        | 21.06            | 21.17     |
| Leesona shrinkage 180 degrees F. in water, % | 18.2                         | 20.0             | 17.9      |
| % dye vs. std equal 100%                     | 101.1                        | 103.1            | 102.1     |
| Textured yarn broken filaments per pound     | .18                          | .38              | 0         |

What is claimed is:

1. A process for the production of poly (ethylene terephthalate) polymer which comprises combining a polymerization catalyst formed by combining a cobalt salt that is soluble in ethylene glycol and aluminum compound selected from the group consisting of aluminum chloride and aluminum hydroxychloride in ethylene glycol, where the mole ratio of aluminum to cobalt is 1 to 1 to 16 to 1, with terephthalic acid and ethylene glycol, or low molecular weight poly(ethylene terephthalate) polymer or oligomer, where the concentration of cobalt in the thus formed mixture is in the range of about 10 to 100 parts per million parts of the mixture and polymerizing the mixture.

2. The process of claim 1 in which the cobalt salt is cobaltous acetate tetrahydrate.

3. The process of claim 1 in which the cobalt salt is selected from the group consisting of cobaltous acetate tetrahydrate, cobaltous nitrate, cobaltous chloride, cobalt acetylacetonate, cobalt naphtbenate, and cobalt salicyl salicylate.

4. A poly(ethylene terephthalate) polymer having a NLRV of greater than about 12 containing catalyst residues of cobalt salt and an aluminum compound selected from the group consisting of aluminum chloride and aluminum hydroxychloride.

5. The polymer of claim 4 in the form of a fiber.

6. The fiber made from polymer of claim 4 which contains titanium dioxide and/or carbon black, and/or sodium isophthalic-5-sulfonate, and/or trimellitic acid glycol ester.

7. The polymer of claim 4 in the form of a film.

8. The polymer of claim 4 in the form of a bottle.

9. A process for the production of poly (ethylene terephthalate) fiber in which there is a reduced need to wipe antimony deposits from the spinneret face which comprises melt spinning a molten mixture of poly(ethylene terephthalate) polymer containing catalyst residue of cobalt salt and an aluminum compound selected from the group consisting of aluminum chloride and aluminum hydroxychloride.

10. The process of claim 1 where sodium isophthalic acid-5-sulfonate glycol ester or trimellitic acid glycol ester is in the mixture to be polymerized.

11. A process for the production of poly (ethylene terephthalate) polymer which comprises combining a catalyst solution in ethylene glycol having an aluminum to cobalt mole ratio in the range of 1 to 1 to 16 to 1 and a chlorine to aluminum mole ratio in the range of 0.25 to 3, with terephthalic acid and ethylene glycol, or low molecular weight poly(ethylene terephthalate) polymer or oligomer, where the concentration of cobalt in the thus formed mixture is in the range of about 10 to 100 parts per million parts of the mixture and polymerizing the mixture.

* * * * *